Dec. 16, 1958
E. B. MANCKE ET AL
2,864,692
RECOVERY OF COPPER AND COBALT VALUES FROM
SULPHATE LEACH SOLUTIONS
Filed Sept. 24, 1956
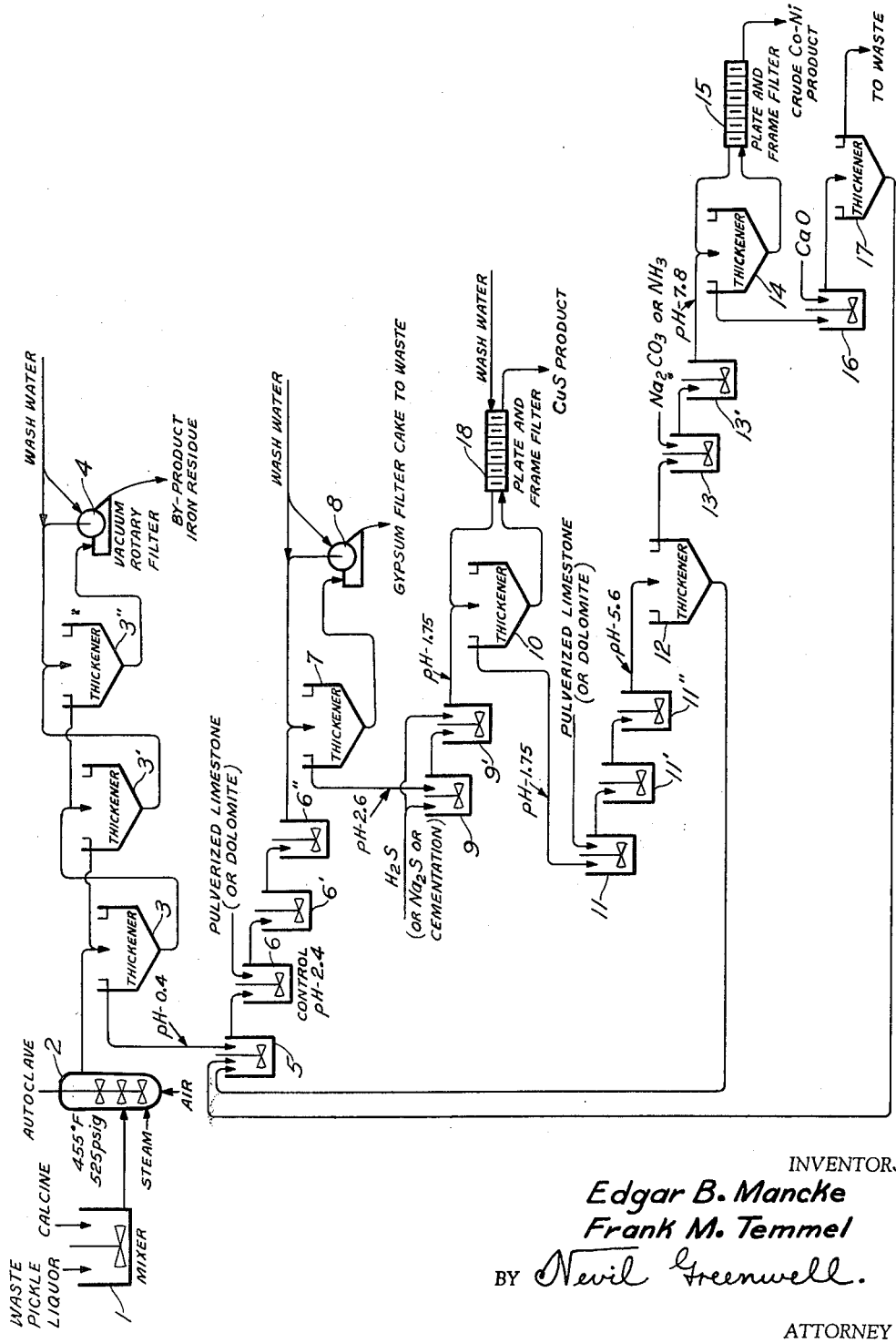
INVENTORS
Edgar B. Mancke
Frank M. Temmel
BY Nevil Greenwell.
ATTORNEY

2,864,692

RECOVERY OF COPPER AND COBALT VALUES FROM SULPHATE LEACH SOLUTIONS

Edgar B. Mancke and Frank M. Temmel, Bethlehem, Pa., assignors to Bethlehem Steel Company, a corporation of Pennsylvania Application September 24, 1956, Serial No. 611,617

10 Claims. (Cl. 75—108)

This invention relates to the recovery of cobalt from calcined pyrite. Pyrite, which is essentially the natural sulfide of iron, sometimes contains small, but valuable quantities of cobalt. Other non-ferrous metals such as copper, manganese, nickel and zinc may be present as well.

An object of this invention is to recover a high percentage of cobalt, with or without nickel, and substantially free of other metals.

Prior methods for the recovery of cobalt from pyrite, or iron pyrites, have been, for the most part, cumbersome and costly. In addition, it has heretofore been difficult to secure an efficient separation of the cobalt from the other metal values present in the ore.

Generally, pyrite is first roasted in a Herreshoff-type furnace to remove sulfur as sulfur dioxide gas. This gas may be recovered for the manufacture of sulfuric acid. The residue remaining after roasting, or calcining, is known as pyrite cinders.

We have found that when pyrite cinders are thoroughly digested in sulfuric acid and/or ferrous sulfate under autoclaving conditions, to solubilize non-ferrous metals, these non-ferrous metals may be separated from solution in an efficient manner by a series of steps wherein the pH of the solution is closely controlled before each separation.

The following analysis is an example of one type of pyrite cinders which may be treated by my process:

| | Percent |
|---|---|
| $Fe_2O_3$ | 80.3 |
| $Co_2O_3$ | 1.15 |
| $CuO$ | 0.90 |
| $Mn_2O_3$ | 0.04 |
| $NiO$ | 0.15 |

The pyrite cinders are treated in an autoclave with sulfuric acid at some temperature around 450° F. until the cobalt, nickel, copper, manganese or other non-ferrous metals are in solution. The unreacted iron oxide remains as solid and is separated from the resultant solution by thickening and filtration. A small amount of iron is retained in solution. The filtrate, which is highly acidic, is given a primary neutralization by the addition of sufficient limestone to raise the pH to a range of from 2.0 to 2.6. Calcium sulfate is removed from the slurry as gypsum cake. With the pH of the solution now ranging somewhere between 2.0 and 2.6, the solution is treated with a sulfide, preferably hydrogen sulfide gas, to precipitate the copper as copper sulfide. The temperature of the solution during the precipitation of the copper is approximately 160° F.

After separating the precipitated copper sulfide from solution by means of filtration, it will be found that the pH of the filtrate has dropped to a range of 1.3 to 2.2 due to the formation of free $H_2SO_4$ from the copper sulfate. It is necessary at this point to give the solution a secondary neutralization by the addition of fresh limestone, this time in sufficient quantity and for sufficient contact time to neutralize the free $H_2SO_4$ formed in the previous step and to raise the pH to approximately 5.2 to 5.7. Iron and possibly some manganese in solution precipitate as the hydroxide at this point. The iron and manganese, along with excess limestone, and a small amount of cobalt carbonate, are removed from solution and recirculated to the primary neutralization step.

The pH at this point should be high enough to precipitate substantially all of the iron, but low enough to keep cobalt precipitation at a minimum. A pH much above 5.7 will co-precipitate an excessive amount of cobalt, thereby increasing the recirculating load. The following table illustrates the desirability of maintaining the pH within the given range for precipitating iron.

Table I

| pH | Percent Cobalt in Iron Precipitate |
|---|---|
| 5.3–5.7 | 1.40–3.60 |
| 5.9 | 5.70 |

The remaining solution contains the bulk of the cobalt. Cobalt may be precipitated along with nickel by the addition of soda ash to the solution. Cobalt may be precipitated separately, if desired, by controlled oxidation with chlorine.

In the drawings,

Fig. 1 is a diagrammatic flow chart illustrating a preferred mode by which my invention may be performed on a continuous basis.

Referring now to Fig. 1, pyrite cinders having an analysis similar to that given in the above example, are mixed with waste pickle liquor in mixing tank 1. The waste pickle liquor will generally contain free sulphuric acid in an amount ranging from 5% to 10%, and ferrous sulfate in a quantity ranging from 10% to 18%. The slurry, resulting from mixing pyrite cinders with the liquor, is transferred to an autoclave 2, where the cinders are leached with the sulfate solution. The autoclaving temperature is approximately 455° F., with a total pressure in the autoclave of approximately 525 p. s. i. The slurry should be aerated during autoclaving, to insure keeping the iron in the oxidized form, by the introduction of air or oxygen. In this example air was used. After leaching for about 30 minutes, the slurry is withdrawn from the autoclave and transferred to a series of three thickeners 3, 3' and 3", and the pulp of the slurry then treated in a drum filter 4. The pulp, which is essentially the residual iron oxide from the leaching operation, is removed from the slurry by the filter. This iron oxide can be sintered preparatory to use as a blast furnace charge. The overflow solution from the first thickener 3 is directed to a re-solution tank 5, where it is mixed with recycled slurry containing small amounts of precipitated iron compound and precipitated cobalt from a later stage in the process, as will be explained.

From tank 5 the slurry is transferred to the first of three neutralizing tanks 6, 6' and 6", limestone being added to tank 6. After a detention time of about 360 minutes the pH will rise to approximately 2.4. In order to provide the most efficient neutralization, the slurry is passed serially from the first neutralizer to the second, and then the third neutralizer. From the neutralizers, the slurry enters a thickener 7, the coagulated solids separated in the thickener being withdrawn to a filter 8. A gypsum cake is formed on the filter, washed, and discarded. The overflow from thickener 7, which comprises a clear liquor having a pH of about 2.4, enters a first precipitation tank 9. Here the solution is treated at a temperature of about 160° F. with hydrogen sulfide gas in an amount equal to about one-half the stoichiometric requirement for precipitation of the copper contained in the solution. After partial precipitation of copper in this tank, the slurry formed here is transferred to a second precipitation tank 9', where the precipitation of the copper as copper sulfide is completed by the addition of a slight excess of $H_2S$ gas. The resultant slurry, which has a pH of between 1.3 and 2.2, is sent to a thickener 10, and, after the clear liquor is decanted from the settled solids, the wet solids are separated from solution by filtration on filter press 18. The cake retained on the filter is recovered as a copper concentrate which may be refined to metallic copper.

From thickener 10, the clear solution, having a pH of about 1.9, is pumped to a secondary neutralization tank 11. Limestone is added to the solution in this tank and the temperature of the solution is maintained at approximately 160° F. The solution passes through two more tanks 11' and 11" during this neutralization stage, the total detention time in the three tanks being approximately 270 minutes. At the completion of the secondary neutralizing step the solution will have attained a pH of from about 5.2–5.7. The slurry formed during neutralizing, wherein an excess of limestone has been added to the solution, is now transferred to a thickener 12. Solids, in the thickener, which are settled and then withdrawn, are recycled to re-solution tank 5. The recycled solids contain unreacted limestone, calcium sulfate, a small amount of iron as ferric hydroxide, and a small quantity of cobalt carbonate. By recycling the solids from the secondary neutralization to tank 5, the cobalt, which has been precipitated, is redissolved and retained in the system.

Furthermore, by recirculating solids at this point, calcium sulfate will be removed in filter 8, without the necessity of an extra separation step to remove the precipitated calcium sulfate.

The solution in thickener 12 is decanted to precipitation tank 13. The solution at this point has a pH of from 5.2 to 5.7. At this point, cobalt can be precipitated under certain conditions. In this example, soda ash was used to precipitate cobalt. Sufficient soda ash is added to tank 13 to raise the pH to 7.5 to 8.2 and to thereby precipitate substantially all of the cobalt from solution. An additional tank 13' may be used to complete the reaction, after which the slurry is treated in thickener 14. As an alternative to the use of soda ash, ammonia gas may be used as the cobalt precipitant. As nickel is precipitated at a pH of 7.5–8.2, nickel present in the solution will be precipitated along with the cobalt, upon the addition of soda ash. A cobalt-nickel concentrate will thus be formed, and this concentrate can be treated by well-known means for the separate recovery of cobalt and nickel, after removal from the system by means of filter 15.

In order to make certain that all of the copper has been removed from the system, the solution, upon leaving tank 12 and before entering tank 13, can be contacted with $H_2S$ gas and any copper sulfide which is precipitated may be removed by means of a filter.

The solution in tank 14 is decanted to tank 16, where it is treated with lime in a scavenger step to precipitate any cobalt and/or nickel which may not have been precipitated in tanks 13 and 13'. The slurry formed in the scavenger step is sent to thickener 17 where the settled solids are drawn off and recycled to re-solution tank 5. The solution separated from the solids flows to waste.

In the foregoing process air is introduced into each of the tanks except those in the copper precipitation stage, tanks 9 and 9'. No air is introduced into the thickeners. The use of air in this manner improves efficiency of precipitation.

It should be noted that in the copper precipitation step, a small amount of cobalt will be co-precipitated with the copper. The amount of cobalt precipitated at this point is dependent upon the pH, the amount of hydrogen sulfide used and the detention time. At lower pH values, the tendency to precipitate cobalt is lessened without diminishing the effectiveness of the $H_2S$ to precipitate the copper. The relationship of pH to the amount of cobalt in the copper precipitate is shown in the table given below:

Table II

| pH before $H_2S$ Addition | pH after $H_2S$ Addition | Percent Cobalt in Dry CuS Product |
|---|---|---|
| 2.10 | 1.30 | 0.09 |
| 2.50 | 1.60 | 0.35 |
| 2.60 | 1.75 | 0.56 |

In the results given above, taken from a series of three tests, conditions such as temperature, amount of $H_2S$ addition, percent of cobalt and copper in the head solution, etc., were constant.

Our process may be operated continuously, and it is to be understood that pumps are located at the necessary locations throughout the system in order to maintain the proper material flow.

While we prefer to use limestone in the neutralization stages of my process, dolomitic limestone or some other form of magnesium carbonate may be used.

Copper may be precipitated by the use of sodium sulfide, or other sulfide, instead of hydrogen sulfide gas.

While our invention has been described in conjunction with an autoclaving leach, the non-ferrous metals may be solubilized by other means, as, for instance, a sulfating roast followed by a water leach.

We claim:

1. The method of recovering cobalt from a calcined pyrite containing iron oxide and copper and cobalt values which comprises leaching said pyrite with an aqueous solution of a member of the group consisting of sulfuric acid, ferrous sulfate and mixtures thereof at elevated temperature and superatmospheric pressure and simultaneously aerating and thereby solubilizing the non-ferrous metals and some iron, separating iron oxide from the resulting solution, neutralizing the solution, to a pH ranging from 2.0 to 2.6, precipitating copper from said solution and separating precipitated copper values from the solution, neutralizing the solution to a pH ranging from 5.2 to 5.7 and thereby forming a precipitate containing iron, separating the thus-formed precipitate from the solution and precipitating cobalt values from said solution by raising the pH to not less than 7.2 with an alkaline precipitant.

2. The method of recovering cobalt from a calcined pyrite containing iron oxide and copper and cobalt values which comprises leaching said pyrite with an aqueous solution of a member of the group consisting of sulfuric acid, ferrous sulfate and mixtures thereof at elevated temperature and superatmospheric pressure with simultaneous aeration and thereby solubilizing the non-ferrous metals and a small amount of iron, separating iron oxide from the resulting solution, neutralizing the solution to a pH ranging from 2.0 to 2.6, precipitating copper from said solution by addition of a sulfide of the group consisting of hydrogen sulfide and sodium sulfide and separating precipitated copper sulfide from the solution, neutralizing the solution to a pH ranging from 5.2 to 5.7 and thereby forming a precipitate containing iron, separating the thus-formed precipitate from the solution and precipitating cobalt values from said solution by raising the pH to not less than 7.2 with an alkaline precipitant.

3. The method of recovering cobalt from a calcined pyrite containing iron oxide and copper and cobalt values which comprises leaching said pyrite with an aqueous solution of a member of the group consisting of sulfuric acid, ferrous sulfate and mixtures thereof at elevated temperature and superatmospheric pressure and simultaneously aerating and thereby solubilizing the non-ferrous metals and a small amount of iron, separating iron oxide from the resulting solution, neutralizing the solution with a compound of the group consisting of calcium carbonate and magnesium carbonate and mixtures thereof to a pH ranging from 2.0 to 2.6, precipitating copper from said solution by addition of a sulfide of the group consisting of hydrogen sulfide and sodium sulfide and separating precipitated copper sulfide from the solution, neutralizing the solution with a compound of the group consisting of calcium carbonate and magnesium carbonate and mixtures thereof to a pH ranging from 5.2 to 5.7, and thereby forming a precipitate containing iron, separating the thus-formed precipitate from the solution and precipitating cobalt values from said solution by raising the pH to not less than 7.2 with an alkaline precipitant.

4. The method of recovering cobalt from a calcined pyrite containing iron oxide and copper and cobalt values which comprises leaching said pyrite with an aqueous solution containing sulfuric acid and ferrous sulfate at elevated temperature and superatmospheric pressure and simultaneously aerating and thereby solubilizing the non-ferrous metals and a small amount of iron, separating iron oxide from the resulting solution, neutralizing the solution with limestone to a pH ranging from 2.0 to 2.6, precipitating copper sulfide from said solution by addition of hydrogen sulfide and separating precipitated copper sulfide from the solution, neutralizing the solution with limestone to a pH ranging from 5.2 to 5.7 and thereby forming a precipitate containing iron, separating the thus-formed precipitate from the solution and precipitating cobalt values from said solution by raising the pH to not less than 7.2 with an alkaline precipitant.

5. The method of recovering cobalt from a calcined pyrite containing iron oxide and copper and cobalt values which comprises leaching said pyrite with an aqueous solution of a member of the group consisting of sulfuric acid, ferrous sulfate and mixtures thereof at elevated temperature and superatmospheric pressure and simultaneously aerating and thereby solubilizing the non-ferrous metals and some iron, separating iron oxide from the resulting solution, neutralizing the solution with limestone to a pH ranging from 2.0 to 2.6, precipitating copper sulfide from solution by addition of sodium sulfide and separating precipitated copper sulfide from the solution, neutralizing the solution with limestone to a pH ranging from 5.2 to 5.7, and thereby forming a precipitate containing iron, separating the thus-formed precipitate from the solution and precipitating cobalt values from said solution by raising the pH to not less than 7.2 with an alkaline precipitant.

6. The method of recovering cobalt from a calcined pyrite containing iron oxide and copper and cobalt values which comprises leaching said pyrite with an aqueous solution of ferrous sulfate at elevated temperature and superatmospheric pressure and simultaneously aerating and thereby solubilizing the non-ferrous metals and a small amount of iron, separating iron oxide from the resulting solution, neutralizing the solution with limestone to a pH ranging from 2.0 to 2.6, precipitating copper sulfide from solution by addition of sodium sulfide and separating precipitated copper sulfide from the solution, neutralizing the solution with limestone to a pH ranging from 5.2 to 5.7, and thereby forming a precipitate containing iron, separating the thus-formed precipitate from the solution and precipitating cobalt values from said solution by raising the pH to not less than 7.2 with an alkaline precipitant.

7. The method of recovering cobalt from a calcined pyrite containing iron oxide and copper and cobalt values which comprises leaching said pyrite with an aqueous solution of a member of the group consisting of sulfuric acid, ferrous sulfate and mixtures thereof at elevated temperature and superatmospheric pressure and simultaneously aerating and thereby solubilizing the non-ferrous metals and a small amount of iron, separating iron oxide from the resulting solution, neutralizing the solution with limestone to a pH ranging from 2.0 to 2.6, precipitating copper sulfide from solution by addition of hydrogen sulfide and separating precipitated copper sulfide from the solution, neutralizing the solution with limestone to a pH ranging from 5.2 to 5.7 and thereby forming a precipitate containing iron, separating the thus-formed precipitate from the solution and precipitating cobalt values from said solution by raising the pH to not less than 7.2 with an alkaline precipitant.

8. The method of recovering cobalt from a sulfate leach solution containing copper and cobalt values and some iron in solution which comprises aerating said solution, neutralizing the solution to a pH ranging from 2.0 to 2.6, precipitating copper from said solution and separating precipitated copper values from the solution, neutralizing the solution to a pH ranging from 5.2 to 5.7 and thereby forming a precipitate containing iron, separating the thus-formed precipitate from the solution and precipitating cobalt values from said solution by raising the pH to not less than 7.2 with an alkaline precipitant.

9. The method of recovering cobalt from a sulfate leach solution containing copper and cobalt values and some iron in solution which comprises aerating said solution and neutralizing the solution in a first stage to a pH ranging from 2.0 to 2.6, precipitating copper from said solution and separating precipitated copper values from the solution, neutralizing the solution in a second stage to a pH ranging from 5.2 to 5.7 and thereby forming a precipitate containing iron, separating the thus-formed precipitate from the solution and recycling said precipitate to the first neutralizing stage and precipitating cobalt values from said solution by raising the pH to not less than 7.2 with an alkaline precipitant.

10. The method of treating a sulfate leach solution containing copper and cobalt values and some iron in solution which comprises aerating said solution, neutralizing the solution to a pH ranging from 2.0 to 2.6, precipitating copper from said solution and separating precipitated copper values from the solution, neutralizing the solution to a pH ranging from 5.2 to 5.7 and thereby forming a precipitate containing iron, and separating the thus-formed precipitate from the solution.

References Cited in the file of this patent

UNITED STATES PATENTS

| | | |
|---|---|---|
| 2,394,874 | Renzoni | Feb. 12, 1946 |
| 2,686,114 | McGauley et al. | Aug. 10, 1954 |
| 2,755,172 | McGauley et al. | July 17, 1956 |
| 2,805,938 | McGauley | Sept. 10, 1957 |